US012711096B2

(12) United States Patent
Kiarashinejad et al.

(10) Patent No.: US 12,711,096 B2
(45) Date of Patent: Aug. 18, 2026

(54) OPTICAL CO-PROCESSOR ARCHITECTURE USING ARRAY OF WEAK OPTICAL PERCEPTRON

(71) Applicant: Georgia Tech Research Corporation, Atlanta, GA (US)

(72) Inventors: Yashar Kiarashinejad, Atlanta, GA (US); Ali Adibi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 952 days.

(21) Appl. No.: 17/919,051

(22) PCT Filed: Apr. 15, 2021

(86) PCT No.: PCT/US2021/027408
§ 371 (c)(1),
(2) Date: Oct. 14, 2022

(87) PCT Pub. No.: WO2021/211793
PCT Pub. Date: Oct. 21, 2021

(65) Prior Publication Data

US 2023/0237015 A1 Jul. 27, 2023

Related U.S. Application Data

(60) Provisional application No. 63/010,279, filed on Apr. 15, 2020.

(51) Int. Cl.
*G06F 15/82* (2006.01)
*G06E 1/04* (2006.01)

(52) U.S. Cl.
CPC ............... *G06F 15/82* (2013.01); *G06E 1/04* (2013.01)

(58) Field of Classification Search
CPC ................................ G06F 15/82; G06E 1/04
USPC .......................................................... 706/16
See application file for complete search history.

(56) References Cited

U.S. PATENT DOCUMENTS

| | | | |
|---|---|---|---|
| 9,354,039 B2 | 5/2016 | Mower et al. | |
| 10,268,232 B2 | 4/2019 | Harris et al. | |
| 10,359,272 B2 | 7/2019 | Mower et al. | |
| 11,373,089 B2 | 6/2022 | Englund | |
| 2008/0027887 A1 | 1/2008 | Barbu et al. | |
| 2017/0351293 A1* | 12/2017 | Carolan | G06E 3/008 |
| 2018/0211158 A1 | 7/2018 | Shainline et al. | |
| 2018/0260703 A1 | 9/2018 | Soljacic et al. | |

(Continued)

OTHER PUBLICATIONS

An Optical/Digital Processor: Hardware and Applications, Casasent et al., 1975 (Year: 1975).*

(Continued)

*Primary Examiner* — Austin Hicks
(74) *Attorney, Agent, or Firm* — Meunier Carlin & Curfman LLC

(57) ABSTRACT

An optical co-processor architecture using array of weak optical perceptron is disclosed in a computing architecture for a neuro-inspired computing platform. The use of weak optical perceptron in this architecture facilitates the manufacturability and use of an exemplary computing microchips having an array of weak-learners in which a plurality of weak-learners of the array are selectively grouped and their outputs are aggregated to provide a coprocessing output for a given computing and decision-making task in an integrated photonic system.

20 Claims, 9 Drawing Sheets

(56) References Cited

U.S. PATENT DOCUMENTS

| | | | | |
|---|---|---|---|---|
| 2019/0095784 | A1 | 3/2019 | Crill et al. | |
| 2022/0044092 | A1* | 2/2022 | Pleros | G06N 3/0675 |
| 2022/0156571 | A1* | 5/2022 | Mehrabian | G06N 3/0675 |

OTHER PUBLICATIONS

Metasurface with Nanostructured Ge2Sb2Te5 as a Platformfor Broadband-Operating Wavefront Switch, Choi et al, 2019 (Year: 2019).*

Ali Adibi, "Ultra-compact Reconfigurable integrated photonic phase shifters," apps.dtic.mil, document No. AFRL-RY-WP-TR-2020-0221, Aug. 2020.

Kiarashinejad et al., "Knowledge discovery in nanophotonics using geometric deep learning." Advanced Intelligent Systems 2, No. 2 (2020): 1900132.

Abdollahramezani et al., "Meta-optics for spatial optical analog computing." Nanophotonics 9, No. 13 (2020): 4075-4095.

Kiarashinejad et al., "Deep learning reveals underlying physics of light-matter interactions in nanophotonic devices." Advanced Theory and Simulations 2, No. 9 (2019): 1900088.

Kiarashinejad, et al., "Deep learning approach based on dimensionality reduction for designing electromagnetic nanostructures." npj Computational Materials 6, No. 1 (2020): 1-12.

Abdollahramezani, et al., "Dynamic hybrid metasurfaces." Nano Letters 21, No. 3 (2021): 1238-1245.

International Preliminary Report on Patentability for International Application No. PCT/US2021/027408 dated Oct. 27, 2022, 7 pages.

International Search Report and Written Opinion received in PCT/US2021/027408 dated Jun. 30, 2021, 13 pages.

Launay et al., "Light-in-the-loop: using a photonics co-processor for scalable training of neural networks." arXiv:2006.01475v2 [cs.LG] Jun. 3, 2020 (Jun. 3, 2020), entire document [online] <URL: https://arxiv.org/abs/2006.01475>.

* cited by examiner

OPTICAL CO-PROCESSOR ARCHITECTURE USING ARRAY OF WEAK OPTICAL PERCEPTRON

RELATED APPLICATION(S)

This application is a national stage application filed under 35 U.S.C. § 371 of PCT/US2021/027408 filed Apr. 15, 2021, which claims priority to, and benefit of, U.S. Provisional Patent Application No. 63/010,279, filed Apr. 15, 2020, entitled "Optical coprocessor architecture using array of weak optical perceptron," which is incorporated by reference herein in its entirety.

TECHNICAL FIELD

This disclosure is directed optical computing systems, more particularly, optical neural network systems.

BACKGROUND

High-performance optical computing systems may be implemented as an optical neural network (ONN). An optical neural network (ONN) is an artificial intelligence neural network (ANN) manufactured with optical components. For example, it has been demonstrated that optical connections may be manufactured and designed to have similar properties to ANN weights. Nonlinearities of optical components have been proposed for use as activation functions in ONNs.

While there has been great advances in material systems and material processing of optical components, current implementations of ONNs are still limited due to the difficulty in controlling the manufacturing of optical connections and their nonlinearities. In addition, errors caused by fabrication imperfections can deteriorate the performance of the fabricated chips for the implementation of ONNs. This has limited the demonstrations of ONNs to date to very simple NNS with few neurons (rather than 10's of 1000 neurons) and with generally unacceptable error rates (e.g., 10% rather than 0.1%). These shortcomings have made the training of optical computing chips very difficult. As a result, demonstrated ONNs are limited to low-efficiency processors with a very small number of neurons, which are currently not useful in real-world computing and modeling applications.

SUMMARY

An optical co-processor architecture using array of weak optical perceptron is disclosed for a neuro-inspired computing platform. The use of weak optical perceptron in this architecture facilitates the manufacturability and use of an exemplary computing microchips having an array of weak-learners in which a plurality of weak-learners of the array are selectively grouped and their outputs are aggregated to provide a co-processing output for a given computing and decision-making task (e.g., classification, pattern recognition operation, clustering, or other AI-related operations) in an integrated photonic system.

Advantageously, the exemplary microchips may be configured to perform high-level computing and decision-making tasks (e.g., pattern recognition) with high accuracy based on a large array of weak-learners that individually could perform similar tasks but with low accuracy. Because marginally successful computing perceptrons can be used, a wide variety of optical domain selections are available, including resonators or meta-atoms in cascaded arrays of metasurfaces. Resonators and metasurfaces offer integrated photonic chips in a variety of material platforms (e.g., silicon, silicon nitride) or meta-surface arrays implemented in the form of hybrid platforms that combine dielectrics and nonlinear/reconfigurable materials.

The aggregation may be performed by voting or weighted means (e.g., majority-weighted-voting/aggregated weighted mean) for a given application. In some embodiments, the weights may be established based on correlation or accuracy. That is, in some embodiments, the majority-weighted-voting operation or aggregated-weighted-mean operation may select detection elements for a WL function that minimizes correlation of the WL elements. In another embodiment, the majority-weighted-voting operation or aggregated weighted mean operation may select detection elements for a WL function that maximizes accuracy of the WL function. The weak-learners of the array may then be re-selected and re-grouped for a next co-processing output. Such co-processing operation can have far better performance as compared to conventional silicon computing counterparts (CPUs and GPUs) performing similar computing and decision-making operations using floating point operations.

The computing architecture may be implemented in electronic, photonic, or other engineering platforms (e.g., quantum computing). The exemplary microchip is configurable to perform high-level computing and decision-making tasks (e.g., pattern recognition) with high accuracy that are, notably, derived from the usage of a large array of weak-learners that by itself can perform similar tasks, but with lower accuracy. In this manner, the exemplary system and method can realize an integrated photonic system without need for ultra-precise design and fabrication requirements of integrated photonics while benefitting from its photonic computing capabilities and potential for parallelism.

In another aspect, an integrated AI photonic chip is disclosed comprising a processor; and a photonic co-processor, the photonic co-processor comprising a first interface to the processor and a photonic structure that couples to the first interface and configured with an array of optical perceptrons, wherein the array includes a plurality of optical perceptrons that are each configured as a weak learner having an output that is aggregated with other weak learner outputs of the array to perform an AI-related operation (e.g., classification, pattern recognition operation, clustering), the photonic structure comprising: an input structure configured as a waveguide for an electromagnetic (EM) input (e.g., having a plurality of wavelength each corresponding to an input feature); a detection layer comprising an array of detection elements, each detection element of the array of detection elements has a pre-defined spatial region that is configured to generate a respective output for a given optical perceptron; and two or more reconfigurable layers of metasurface structures located between the input structure and the detection layer, including a first metasurface layer and a second metasurface layer, each of the first metasurface layer and the second metasurface layer being re-configurable (e.g., to modulate polarization, frequency, phase, output amplitude or to block transmission to an underlying layer), via control signals from the processor to through the first interface to first controllable elements associated with the first metasurface layer, (e.g., training or execution operation) to vary transmission of the EM input to the detection layer.

In some embodiments the first metasurface layer is configured to modulate, based on the control from the first interface with the processor, at least one of: polarization, frequency, phase, amplitude of the EM input.

In some embodiments, the first interface comprises one or more digital-to-analog (DA) converters; and a set of one or more drivers that is coupled to the first controllable elements of the first metasurface layer.

In some embodiments, the first metasurface layer has a first optical transparent characteristic at a first bias, wherein the first metasurface layer has a second optical transparent characteristic at a second bias, and wherein the first optical transparent characteristic is different from the second optical transparent characteristic to alter a degree of polarization, frequency, phase, amplitude of the EM input.

In some embodiments, the first interface comprises one or more second digital-to-analog (DA) converters; and one or more photoelectric source assemblies (e.g., laser) coupled to the one or more DA converters, each of the one or more photoelectric sources being configured to generate the EM input.

In some embodiments, the photoelectric source assemblies are coupled to a first end of an optical interconnect, wherein the optical interconnect includes a second end that couples to the input structure.

In some embodiments, the first metasurface layer comprises dielectric or plasmonic inclusions configured to modulate amplitude, phase, polarization, and frequency of the EM input in a subwavelength regime.

In some embodiments, the photonic co-processor further comprises a second interface to the processor, and wherein the second interface comprises one or more converters (e.g., analog-to-digital converters, frequency-to-digital converters, etc.) including a first converter that couples to a first detection element of the detection layer.

In some embodiments, the first converter further couples to a second detection element, wherein the output of the first detection element and the second detection element are aggregated to generate a combined output for AI-related operation.

In some embodiments, the AI-related operation includes at least one of: classification, pattern recognition operation, and clustering.

In some embodiments, the first interface comprises one or more second digital-to-analog (DA) converters; and a set of second drivers that is coupled to second controllable elements associated with the second metasurface layer.

In some embodiments, the photonic co-processor comprises a second interface to the processor and the photonic structure, wherein the second interface comprises one or more second digital-to-analog (DA) converters; and a set of second drivers that is coupled to second controllable elements associated with the second metasurface layer.

In some embodiments, the integrated AI photonic chip further comprises a memory that stored instructions to be executed by the processor, wherein execution of the instructions by the processor, causes the processor to select a weak learner for a given AI operation (e.g., wherein the selection is based on at least of minimal correlation and higher accuracy for the given AI operation).

In some embodiments, the photonic co-processor further comprises a controller configured by instructions (e.g., instruction code or logic circuitries) to select a weak learner for a given AI operation (e.g., wherein the selection is based on at least of minimal correlation and higher accuracy for the given AI operation).

In some embodiments, the first metasurface layer comprises a reconfigurable hybrid metal-dielectric metasurface structure.

In some embodiments, the reconfigurable hybrid metal-dielectric metasurface structure comprises $Ge_2Sb_2Te_5$.

In some embodiments, the second metasurface comprises a reconfigurable phase-change metasurface structure.

In some embodiments, the reconfigurable phase-change metasurface structure comprises GST or GSST (Ge—Sb—Se—Te).

In some embodiments, the reconfigurable phase-change metasurface structure is configured to adjust a spectrum of the EM input in at least one of a visible spectrum, a near-IR spectrum, and a mid-IR spectrum.

In some embodiments, the integrated AI photonic chip further includes a memory that stored second instructions to be executed by the processor, wherein execution of the second instructions by the processor, causes the processor to transmit a first configuration signal associated with a first AI operation at a first time period; transmit a first data signal associated with the first AI operation concurrent in part with the first time period; transmit a second configuration signal associated with a first second AI operation at a second time period (e.g., for a set of clock cycle that follows clock cycles associated with the first AI operation); and transmit a second data signal associated with the second AI operation concurrent in part with the first time period.

BRIEF DESCRIPTION OF THE DRAWINGS

The accompanying drawings, which are incorporated in and constitute a part of this specification, illustrate embodiments and together with the description, serve to explain the principles of the methods and systems.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Figure 1A:
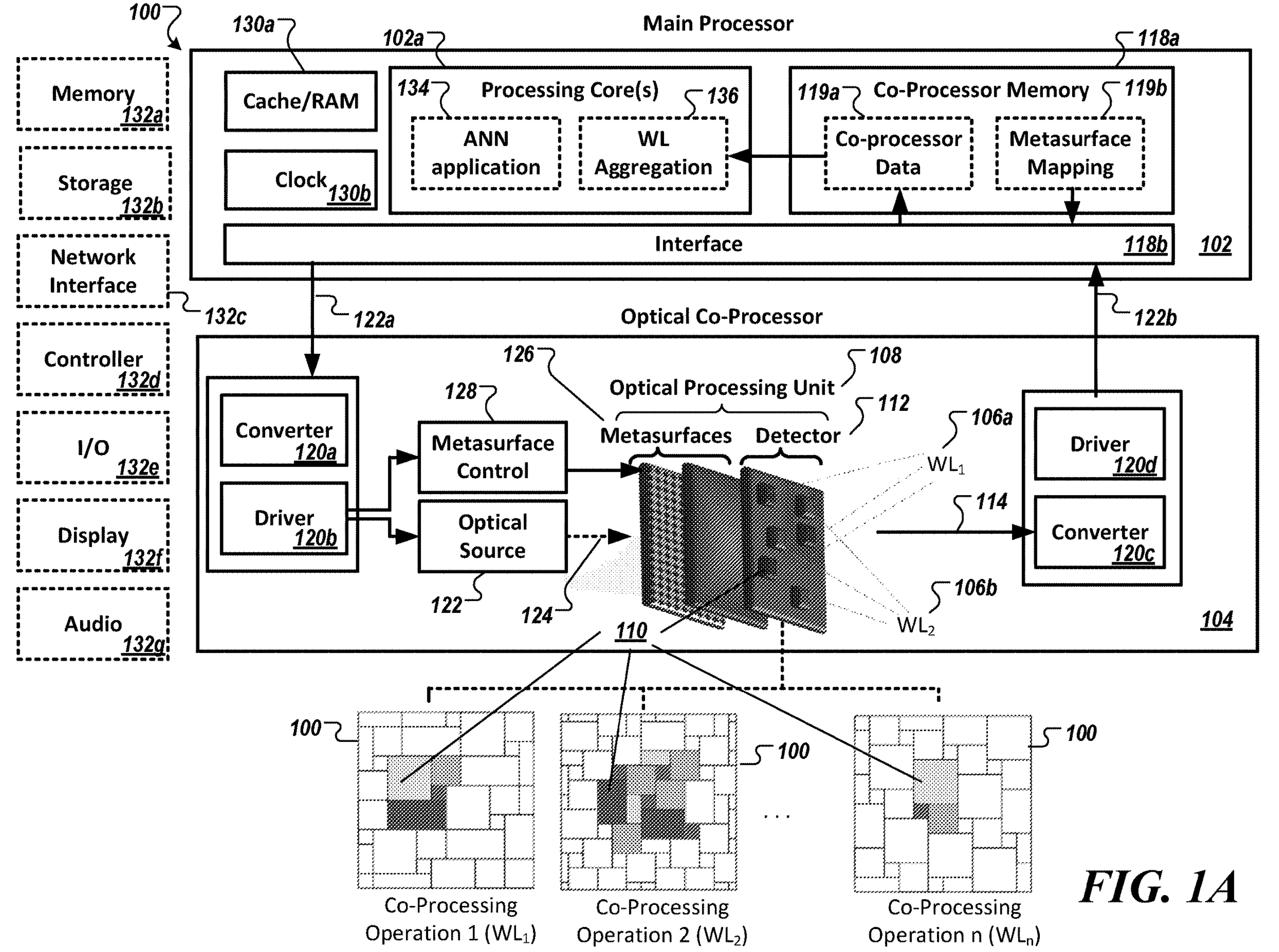
FIG. 1A shows an optical co-processor system configured with an array of weak optical perceptrons (interchangeably used herein as an array of weak-learners) to execute an AI-related application in accordance with an illustrative embodiment.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practiced or carried out in various ways.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "n" corresponds to the nth reference in the reference list. For example, Ref. [1] refers to the $1^{st}$ reference in the list. All references cited and discussed in this specification are incorporated herein by reference in their entireties and to the same extent as if each reference was individually incorporated by reference.

Example System

FIG. 1A shows an optical co-processor system 100 configured with a main processor unit 102 that interoperates with an optical co-processor unit 104 configured with an array of weak optical perceptrons 106 (shown, and used interchangeably herein, as an array of weak-learners ("$WL_1$") 106*a* and ("$WL_2$" 106*b*) to execute an AI-related application in accordance with an illustrative embodiment. The main processor unit 102 comprises one or more processing core(s) (shown as 102*a*) configured to execute computer readable instructions, including, e.g., the AI-related application. The optical co-processor system 100 may be configured as a micro-processor, a micro-controller, digital signal processors, application specific integrated circuit (ASIC) processors, and the like.

The optical co-processor unit 104 comprises at least one optical processing unit 108 that includes a plurality of detection elements 110 that are reconfigure-ably grouped to define a given array of weak learners 106. A weak-learner is a marginally good optical perceptron that is derived or defined by one or more detection elements 110 formed within a detector structure 112 (e.g., a detector layer 112) of the co-processor optical processing unit 108. Each detection element 110 has a pre-defined spatial region in the detector structure 112 that is configured to generate a respective output 114 for a given optical perceptron. The individual outputs of the weak learners 106 are aggregated together to provide a combined output that is reconfigurable and is of higher accuracy for an AI-related operation, e.g., for use in a classification, pattern recognition operation, clustering, etc.

In one example, the WL is employed in a NN-type architecture to perform specific computing tasks (e.g., classification, recognition, clustering, etc.). Although the WL has a reasonably small accuracy (say, 55-60%), by using huge parallelism of optics, many such independent or individual WLs 106 can be aggregated to collectively provide a result that is close to 100% accuracy. In FIG. 1A, detection elements 110 having different performance characteristics for a given AI computing tasks are shown grouped to collectively provide a co-processing operation (shown as "Co-Processing Operation 1 ($WL_a$)", "Co-Processing Operation 1 ($WL_2$)", to "Co-Processing Operation 1 ($WL_n$)". In addition, this architecture can be scaled to perform multiple tasks simultaneously (e.g., having multiple detection layers in which each layer is configured for a given task or a given detection layer being segmented for a given task). In some embodiments, the number of tasks can be increased by reconfiguring the architecture using the reconfigurable MSs, e.g., at multi-MHz speeds.

Referring to FIG. 1A, the main processor unit 102 comprises a co-processor interface 118 (e.g., shown in this example as co-processor memory 118*a* and interface 118*b* (e.g., buffers)) that provides the hardware and middleware components to interface with the optical co-processor unit 104. The co-processor memory 118*a* includes inputs and outputs of the optical co-processor unit (shown as "Co-processor Data" 119*a*).

The optical co-processor unit 104 comprises a processor interface 120 that provides hardware to convert signals 122*a* (e.g., electrical or buffer signals) received from the main processor unit 102 to optical signals for use in the optical co-processor unit 104 and to convert optical signals in the optical co-processor unit 104 to signals 122*b* (e.g., electrical signals) for use by the main processor unit 102. In the example of FIG. 1A, the processor interface 120 includes one or more digital-to-analog converters 120*a* and drivers 120*b* that provide inputs to the optical co-processor unit 104 and one or more analog-to-digital converters 120*c* and drivers 120*d* that provide outputs to the main processor unit 102.

The optical processing unit 108 comprises the optical source 122, the detector structure 112 and various optical components such as lens, waveguides, modulators, coupling, and/or resonators (microring), etc. can be used for an AI application. Examples of optical processing units are provided in [1]-[10]. The processor interface 120 (e.g., 120*b*) is configured to drive the optical source 122, which generates a light or laser beam 124, or some other EM signal or input, that will travel through the optical processing unit 108 to the detector structure 112. The optical source 122 may include one or more lasers, light emitting diodes, or some EM generating emitters.

In some embodiments, the optical processing unit 108 comprises one or more layers (e.g., reconfigurable layers) of metasurface structures 126 that are disposed between the optical source 122 and the detector structure 112 and are reconfigurable, e.g., to modulate polarization, frequency, phase, output amplitude or to block transmission to all or a portion of an underlying layer, via control signals.

In some embodiments, the metasurfaces structures 126 may be modulated by the main processor unit 102 in the ANN application to alter (e.g., polarization, frequency, phase, output amplitude or to block transmission) the light or laser beam 124 prior to it being received by the detector 112. The optical co-processor unit 104 may include metasurface control 128 that drives electrical, thermal, capacitance, optical transmissivity changes to the metasurfaces structures 126 to provide high degree of control over the connectivity between different layers of the optical processing unit 108 and weighs. The metasurface structures may be configured as an MS arrays, in some embodiments, to offer high degree of control over the nonlinear activation function and some degree of control. In some embodiments, the co-processor memory 118*a* includes memory mapping to provide inputs and output interface between the metasurface controls (shown as "Metasurface mapping" 119*b*) and the processing core 102*a*.

The main processor unit 102 may include other internal components 130 (e.g., shown as internal cache or internal RAM 130*a*, clocks 130*b*, controllers (not shown) (e.g., bus controllers, power controller), etc.). The main processor unit 102 may interface with various external and/or integrated circuit components 132 (e.g., external memory 132*a*, external storage device 132*b*, external network interface 132*c*, motherboard or device controller 132*d*, external I/O 132*e*, display interface 132*f*, audio interface 132*g*, among others) to execute the AI application 134 (shown as "ANN application" 134). The storage device 132*b* may store, e.g., computer readable instructions to execute the AI application.

In some embodiments, and as shown in FIG. 1A, the main processor unit 102 may execute a weak-learner aggregation application 136 configured to read WL data from the co-processor data 119*a* from co-processor memory 118*a* for a given co-processing AI-task (e.g., classification, pattern recognition operation, clustering, or other AI-related operation) and to aggregate the read WL data to provide a co-processor output for the AI-related operation to the ANN application 134. The aggregation may be performed, in some embodiments, by voting or weighted means (e.g., majority-weighted- voting/aggregated weighted mean) for a given application. That is, weak learners may be associated with optimum weights (pre-defined from a training operation) for the detection elements and can perform the decision-making based an aggregation operation such a majority-weighted-voting operation or an aggregated weighted mean operation. Indeed, the weak-learner aggregation application 136 allows the weak-learners 108, in one embodiment, to operate as a software-defined array for decision-making tasks. The large array of weak-learners 106 (e.g., metasurfaces (MS)) may be used for classification and pattern recognition, etc., at high confidence. Training approaches can be developed for such computing paradigms, e.g., for computing and image analysis using this powerful brain-inspired computing platform.

The exemplary optical co-processor system (e.g., 100) may be configured as high-efficiency optical NNs with large effective number of neurons that can be used in real-world computing, modeling, and control applications. The exemplary platform may be implemented as an ultra-efficient co-processor, e.g., using a large set of marginally good optical perceptrons (e.g., weak-learners (e.g., 106)), which can be used to realize practical optical computing solutions with orders of magnitude performance improvement over the electronic counterparts (e.g., GPUs). Since marginally successful computing perceptrons can be used, a wide variety of choices in optical domain are available for the exemplary platform such as a set of resonators or a set of meta-atoms in cascaded arrays of metasurfaces. Resonators and cascaded arrays of metasurfaces, among other optical NN topology, may be employ in integrated photonic chips. The integrated photonic chips may be implemented in a variety of material platforms (e.g., silicon, silicon nitride) or metasurface arrays implemented in the form of hybrid platforms that combine dielectrics (e.g., silicon nitride, titania, hafnia) and nonlinear/reconfigurable materials (e.g., phase-change materials (PCM), lithium niobate, nonlinear optical polymers).

Example Operation

Figure 2A:
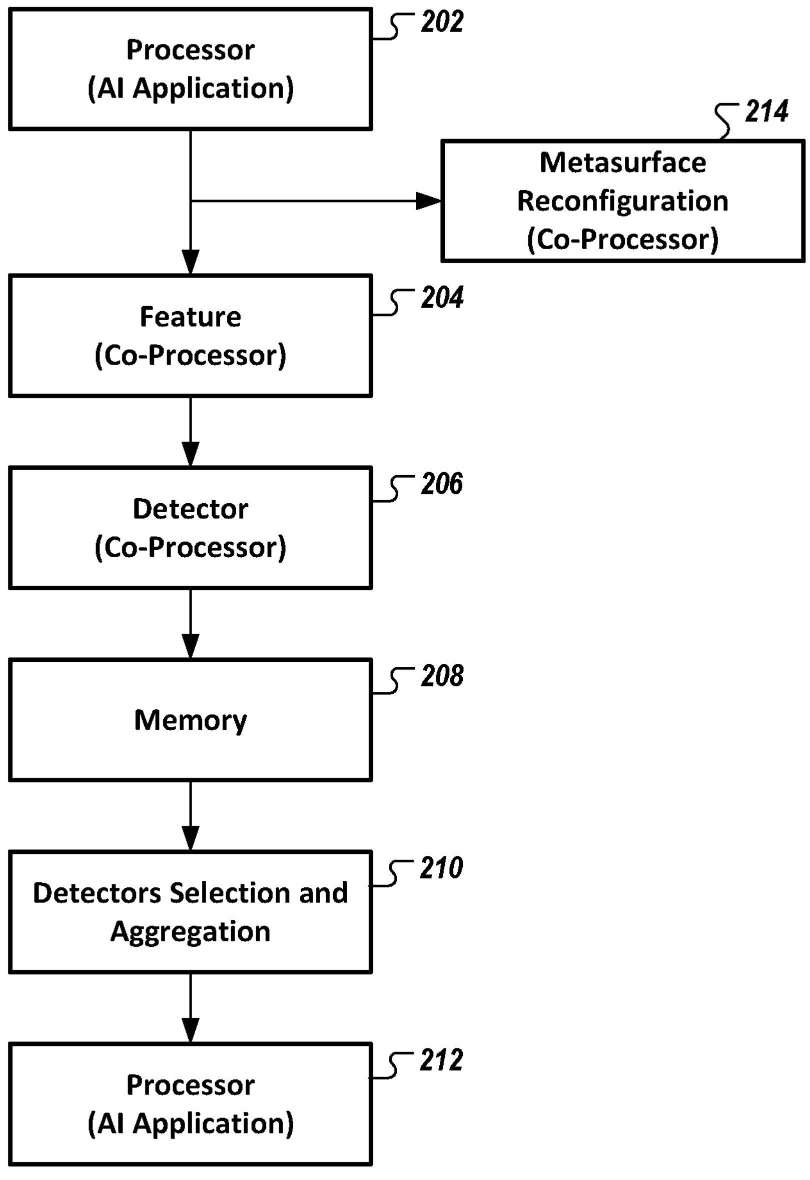
FIG. 2A shows an example operation of the optical co-processor system of FIG. 1A in accordance with an illustrative embodiment.
Figure 2B:
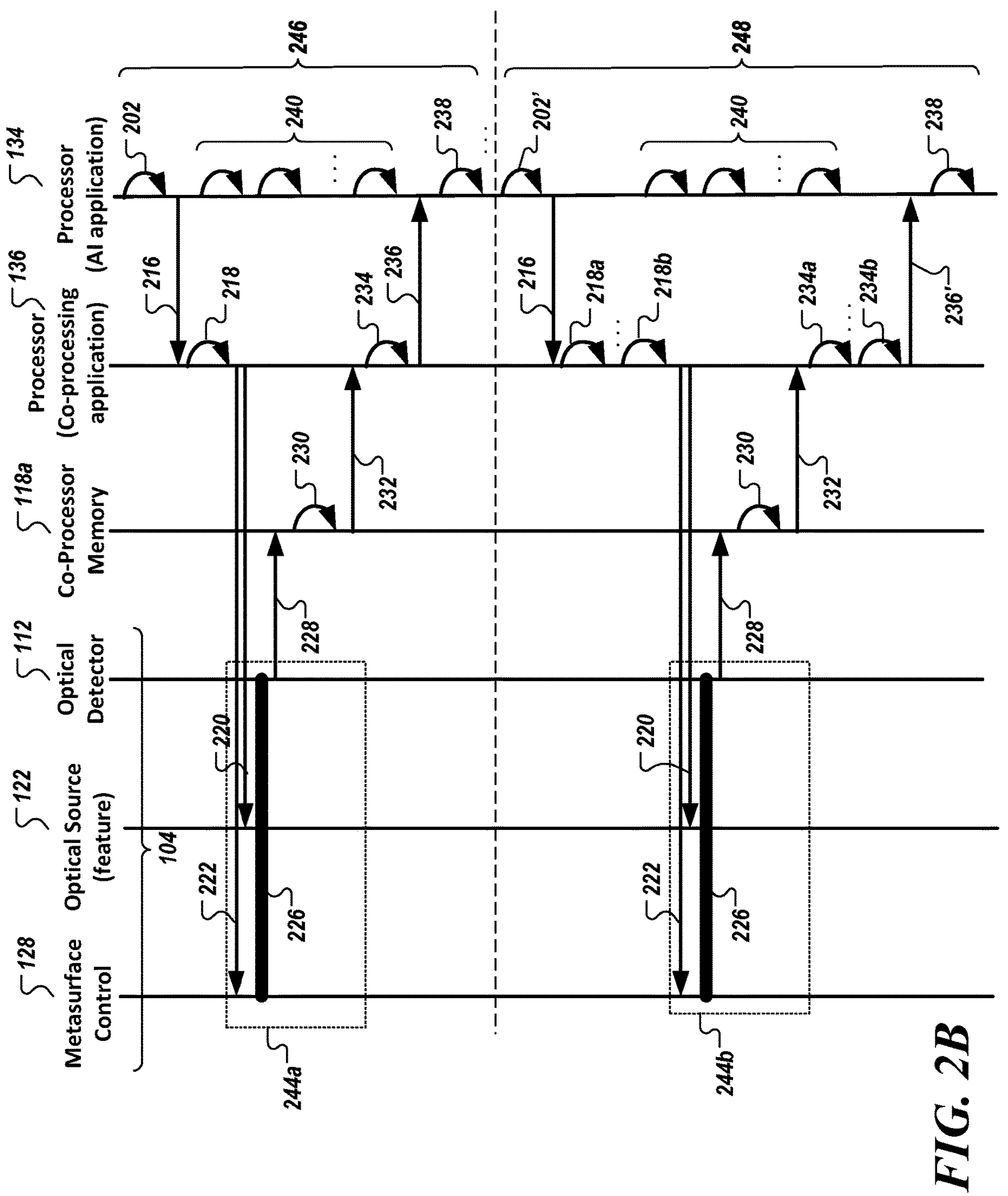
FIG. 2B shows a waterfall diagram illustrating the operation of FIG. 2A in accordance with an illustrative embodiment.

FIG. 2A shows an example operation of the optical co-processor system 100 of FIG. 1A in accordance with an illustrative embodiment. FIG. 2B shows a waterfall diagram illustrating the operation of FIG. 2A in accordance with an illustrative embodiment and Is discussed concurrently with FIG. 2A below.

In FIGS. 2A and 2B, the processing unit (e.g., 102*a*) of a main processor unit 102 is executing (e.g., by the processor 202 shown in FIG. 2A) an ANN application (e.g., 134). A co-processor operation (e.g., 136) is called (216) by a co-processor function call in the ANN application (e.g., 134). The co-processor function call may be for a classification, pattern recognition, clustering, or other AI-related tasks or operations to be executed by optical processing by the optical co-processor unit (e.g., 104).

The co-processor operation (which handles the WL aggregation operation 136) processes (218) the ANN command and a feature is sent (220) to the optical co-processor unit (e.g., 104). In some embodiments, the processing unit (e.g., 102*a*) is configured to receive an ANN command, e.g., at a port or network interface (e.g., from another processor or an external computing device, and relay the received ANN command to the optical co-processing unit (e.g., 108). In other embodiments, the optical co-processor unit (e.g., 104) includes an external input that provides input to the optical processing unit (e.g., 108).

In some embodiments, the co-processor operation (e.g., 136) also sends (222) a metasurface control command to the optical co-processor unit (e.g., 104) that provides a metasurface configuration. In some embodiments, the metasurface control command is configured as an image in which each pixel corresponds to an actuate-able position (corresponding to the pixel location) and degree of actuation (corresponding to the pixel value) of the metasurface. The metasurfaces may be controlled (i.e., to vary) at multi-MHz speeds, in some embodiments, to reconfigure the operation of the optical processing unit (e.g., 108).

The optical co-processor unit (e.g., 104) converts (e.g., to generate a feature 204 shown in FIG. 2A) the ANN command to an optical signal (e.g., a light or laser beam) corresponding to a feature in the ANN application. The optical processing unit (e.g., 108) modulates (226) the generated optical signal (e.g., 124) which is detected (by detector 206 shown in FIG. 2A) by the plurality of detection elements 110, as WLs, of the optical processing unit 108. The optical processing unit 108 provides its WL outputs to co-processor memory 118*a*, which stores (230) the WL outputs in a memory map (in memory 208 of FIG. 2A) corresponding to the co-processor data (e.g., 119*a*). In some embodiments, the co-processor data are stored as an image file (e.g., having file metadata along with the data).

The co-processor operation (e.g., 136) (shown as aggregation operation 210 of FIG. 2A) may access and read (232) the WL outputs, e.g., as an image file or data file in which each pixel corresponds to detection element (e.g., 110). The co-processor operation (e.g., 136) then aggregates (234) the read WL outputs to provide an output (236) to the ANN application (e.g., 134). In some embodiments, the read WL outputs may be aggregated by voting or weighted mean operation (e.g., majority-weighted-voting operation or aggregated weighted mean operation operation). Examples of the voting operation is described in Littlestone et al., "The Weighted Majority Algorithm," Information and Computation. 108 (2): 212-261 (1994). The aggregated weighted mean may be performed as a weighted arithmetic mean of a numeric input vector.

The co-processor operation (e.g., 136) may return (236) a value to the co-processor function call executed by the ANN application (e.g., 134). The ANN application (executing in processor 212 of FIG. 2A) can then execute (238) the next set of instructions of the application following the co-processor function call. In some embodiments, the WL aggregation instructions are a part of the ANN application.

Indeed, the ANN application (e.g., 134) can continue to execute its instructions (shown as 240) while the co-processing operation is being performed by the optical co-processor unit (e.g., 104). Because of the high-speed throughout of optical processing unit (e.g., 108), a given optical co-processing operation may be performed within tens of milliseconds. Notably, the digital processing time (e.g., to access, read, and write to various buses) may be longer in duration than the processing time of the optical processing unit.

Parallel Optical Co-Processing Operations

FIG. 2B shows another example operation of the optical co-processor system 100 to perform multiple optical co-processing operations concurrently. Because of the parallel nature of optical computing (e.g., segmenting or utilizing portions of the detector (e.g., 112) of the optical processing unit (e.g., 108) for a given task), multiple co-processing operations may be performed simultaneously by the optical processing unit. To this end, a single co-processing operation performed by the optical processing unit (e.g., 108) may take the same amount of time as multiple co-processing operations (e.g., 2, 3, 4, 5, 6, 7, 8, 9, 10, etc.). Additionally, different operations (classification, clustering, pattern recognition) may be performed concurrently regardless of their complexity so long as the associated arrays of WLs of the optical processing unit (e.g., 108) are available to perform such operations.

As an illustration of the scalability and parallel operation of optical co-processing, in FIG. 2B, the optical co-processing operations (244*a*) that is called within ANN application sequence 246 for a single optical co-processing task (244*a*) is shown to be identical to the co-processing operation (244*b*) that is performed for multiple optical co-processing tasks (244*b*) within ANN application sequence 246. Indeed, the same control and data are generally being transferred between the main processor unit (e.g., 102) and the optical co-processor unit (e.g., 104). Rather, the information that is provided to the optical co-processor unit (e.g., 104) may cause different parts of the detector (e.g., 112) to be utilized, the outputs of which are similarly transferred (e.g., in data size) to the same memory map.

As shown in FIG. 2B, when processing multiple optical co-processing tasks in sequence 248, the co-processor operation (e.g., 136) may perform multiple processes (now shown as 218*a* and 218*b*) to provide the ANN command in which each process corresponds to the optical co-processing task. In addition, multiple co-processor operations (e.g., 136) may be invoked, e.g., one for each of the ANN tasks, to aggregate (shown as 234*a* and 234*b*) each read WL outputs to provide the outputs (236) for the multiple co-processing tasks to the ANN application (e.g., 134).

In some embodiments, the function call (shown as 202') from the ANN application may be configured as a generalized co-processor function call (rather than a specific task or operator function call) that can receive one or more task or functions calls as objects for its inputs. The return output for that function call (shown as 236') can return multiple set of values, one set for each of invoked ANN tasks. Alternatively, in some embodiments, multiple operations can be invoked using multiple function calls, but the calls are not executed until a start co-processing operation function call is received.

Generalized Spatial Light Modulators and Manipulators for Optical Computing

Figure 4:
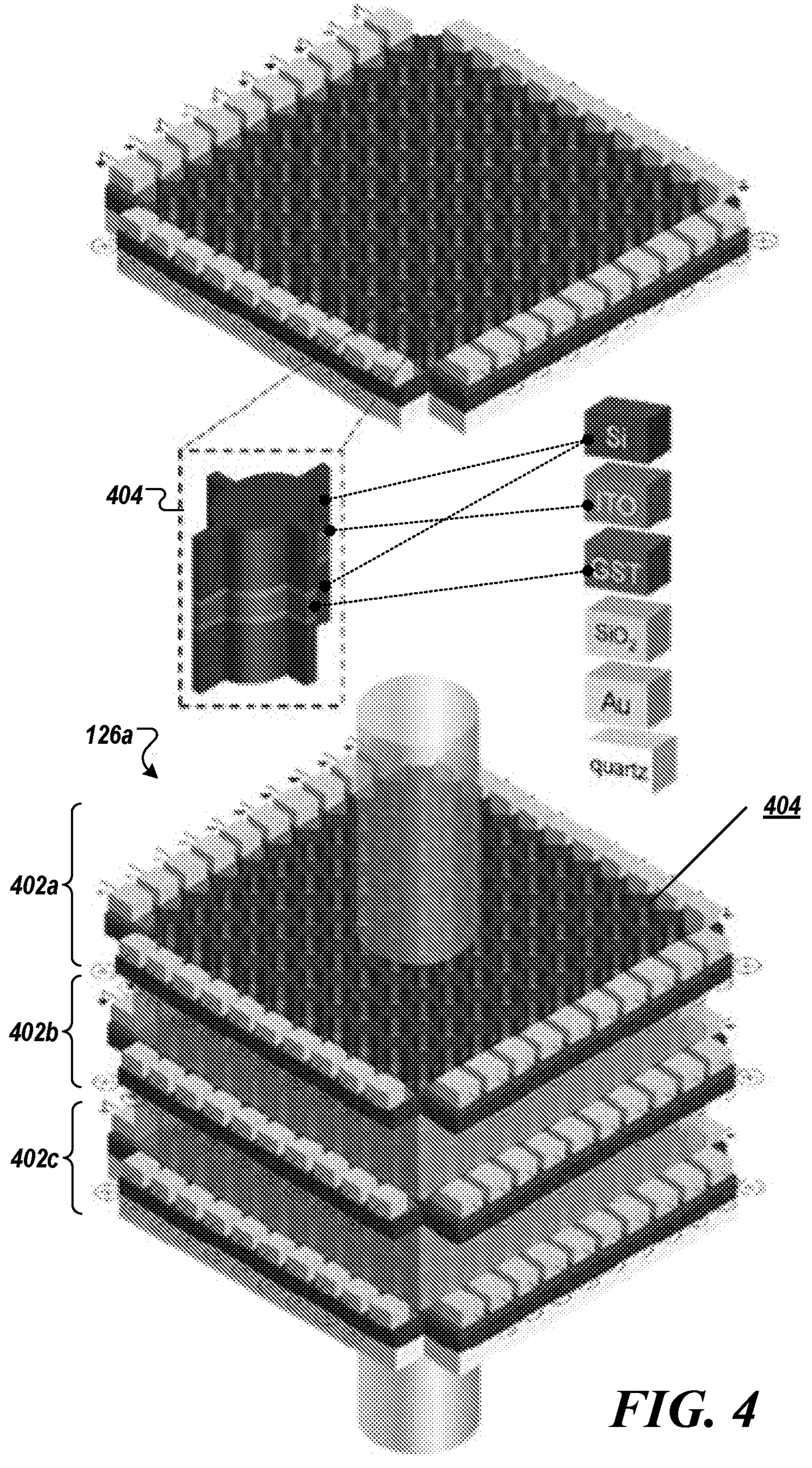
FIG. 4 shows an example reconfigurable metasurface structure formed as an integrated photonic phase shifter platform that may be used in an optical co-processor system in accordance with an illustrative embodiments.

In another aspect, to improve the operation of the optical processing unit for ONNs, a large array of weak-learners may be used in combination with metasurfaces (MS) for classification and pattern recognition at high confidence. FIG. 4 shows an example reconfigurable metasurface structure 126 (shown as 126*a*) formed as an integrated photonic phase shifter platform that may be used in an optical co-processor system (e.g., 100) in accordance with an illustrative embodiments. In FIG. 4, the metasurface structure 126*a* comprise multiple arrays 402 of phase shifting unit cells 402 in which the arrays 402 are configured in a cascading configuration (shown as 402*a*, 402*b*, 402*c*). In FIG. 4, each array 402 comprises unit cells 404 formed as an integration of Si and GST that can change the index of refraction that can be used for spatial-spectral coding of an optical wavefront.

The ability to change the index of refraction of a phase change materials (PCMs) by a large amount at subwavelength scales can be used by the reconfigurable MSs (e.g., 126*a*) for spatial-spectral coding of an optical wavefront, e.g., to manipulate the amplitude, phase, polarization, and spectral content of an optical beam with subwavelength resolution. The platform (e.g., 126*a*) can be considered as a universal spatial/spectral light modulator (SLM) in which each ultra-small unit cells (e.g., corresponding to a pixel) can be used to provide fast reconfiguration (100's ns corresponding to a few MHz), low power consumption, large-scale (limited only by fabrication), and high dynamic range. This speed provided by the PCMs is suitable for optical computing application (as well as imaging, spectroscopy, etc.).

In FIG. 4, because of its ultra-thin topology, several MS layers may be combined to form a 2.5-dimensional (2.5D) reconfigurable architecture as the universal optical computing cube. The actual functionality of such a cube can be programmed using the reconfigurable MSs. Although the entire MS may be reconfigured or reconfigurable, having only a subset of them reconfigurable may be sufficient to provide the needed degrees of freedom for a given application.

The 2.5D metasurface structure 126*a* may be used in a brain-inspired computing platform, e.g., implementing a neural-network (NN)-type architecture described herein. The reconfigurable multi-MS architecture can be used, in some embodiments, to mimic a multi-neuron platform in which each neuron can be modeled by a MS unit cell (which can incorporate several meta-atoms). The reconfiguration, during the energization, of PCMs allows for the control of interactions between neurons in adjacent layers, e.g., up to the level that light propagation allows such neurons to interact. One major advantage of the MS-based platform is the width of the NN it provides. Here, the width corresponds to the amount of data that can be placed in the network in parallel (i.e., the number of pixels in the first MS layer), a demonstration of the advantage of optics over electronics (electronics cannot provide for such parallel operation). By implementing the NN-like architecture using the structure depicted FIG. 4 for the first few layers of a computing platform to condense the huge input data and moving the deeper layers to electronics, a hybrid photonic/electronic computing platform can result with far better capabilities than conventional electronic deep-learning architectures could be created. The effect of fabrication imperfections and environmental changes in the multi-MS architecture can be mitigated by focusing on specialized computing paradigms like a large array of weak-learners (WLs) as shown and described in relation to FIG. 1A. Here, each WL is trained using a subset of the pixels in the final NN-type architecture to perform specific computing tasks (e.g., classification, recognition, clustering, etc.) with a reasonably small accuracy (e.g., 55-60%). Because of the huge parallelism of optics, many such independent WLs can be trained using the architecture in FIG. 1A to collectively result in close to 100% accuracy. This architecture can be scaled to perform multiple tasks simultaneously. The number of tasks can be increased by reconfiguring the architecture using the reconfigurable MSs at multi-MHz speeds. This will be a truly practical path to brain-inspired optical computing with superior performance over electronics.

Additional Example Metasurfaces for Optical Computing

Figure 5:
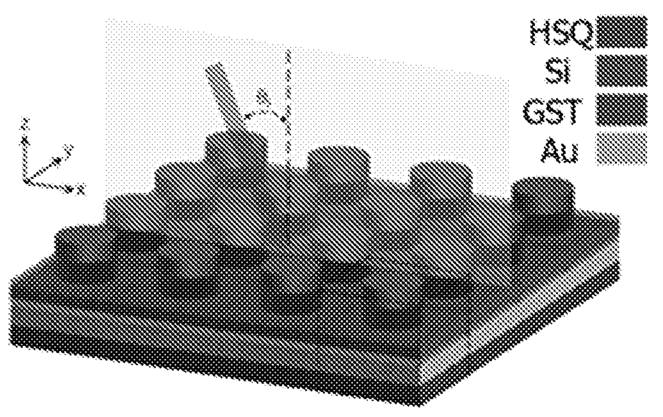
FIG. 5 shows another example of reconfigurable hybrid metal-dielectric MSs for spectral engineering using GST ($Ge_2Sb_2Te_5$), which can be used in an metasurfaces (MS) array.
Figure 5:
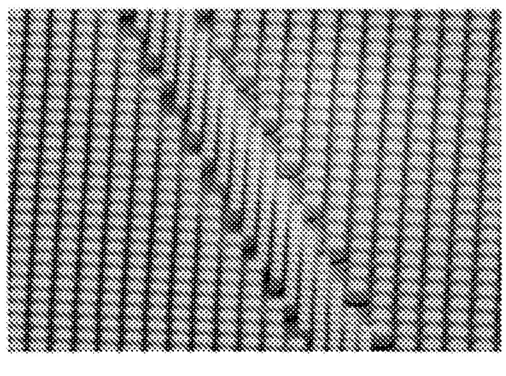

FIG. 5 shows another example of reconfigurable hybrid metal-dielectric MSs for spectral engineering using GST ($Ge_2Sb_2Te_5$), which can be used in an metasurfaces (MS) array. The reconfigurable hybrid meta-surface platform incorporates the phase-change alloy germanium antimony telluride (GST) into metal-dielectric meta-atoms for active and non-volatile tuning purposes. The platform includes a silicon (Si) nanostructure sitting on top of a GST or any other relevant phase-change material (PCM) layer deposited on an optically opaque gold (Au) back-reflector. The GST works as a functional dielectric medium whose optical properties can be tuned by applying a controllable external stimulus, such as a set of electrical pulses.

The exemplary platform and associated architecture may combine the unique features of dielectric MSs (with carefully engineered meta-atoms) and phase-change materials (PCMs) with ultra-large dynamic range for reconfigurability and nonlinear properties to provide high precision of control over an optical wavefront. The exemplary platform and associated architecture may use this highly controlled MS platform in a multi-layer architecture to enable innovative ways of information processing in the spatial, spectral, and polarization domains with performance measures far beyond the state-of-the-art.

The exemplary platform and associated architecture may combine recent advances of metasurfaces and optical nano-antennas with sensing, processing and information science using active and non- linear metasurfaces to decode, measure, and process optical signals based on different intrinsic properties of light (e.g., frequency, state of polarization, orbital angular momentum, and angle of incidence). The metasurfaces may be used to achieve a variety of optical functions, including optical image and signal processing, filtering, sensing and photodetection functions across the spectrum (VIS, Near-IR/Mid-IR) and may be extendable to more complex operations on the detected images.

Additional description of the metasurface structure 126*a* may be found in [6]. Examples of other metasurface structures that may be employed may be found in [7], [8], [9], [10], [11].

Example Weak-Learners and Configuration

The weak-learners (e.g., 106) can be fabricated using passive dielectric metasurfaces. A range of possible materials capable of performing are available in a wide range of wavelengths (e.g., $TiO_2$, $HfO_2$, Si, and $LiNbO_3$). Alternatively, in some embodiments, the weak-learners can be integrated with nonvolatile electrically reconfigurable phase-change materials (PCMs) for a wide range of wavelengths (e.g., GST and GSST (Ge—Sb—Se—Te) for infrared, and $Sb_2S_3$ for visible) and formed as a multi-layer structures with a combination of passive and active/nonlinear metasurfaces, as for example described in relation to FIGS. 4 and 5.

In some embodiments, the weak-learners are used to sort photons by their intrinsic components and at a subwavelength-scale. In some embodiments, the weak-learners employ photodetection and hyperspectral imaging strategies across a wide variety of spectrum (e.g., VIS, Near-IR/Mid-IR). In some embodiments, the weak-learners include metasurfaces for integration into systems for front-end processing for sensors, image processing and equation solving. In some embodiments, the exemplary computing platform and associated architecture is used in the design of high-performance computing and decision-making tasks using practically manufacturable solutions with ultra-high-speed processing despite fabrication imperfections.

Figure 6:
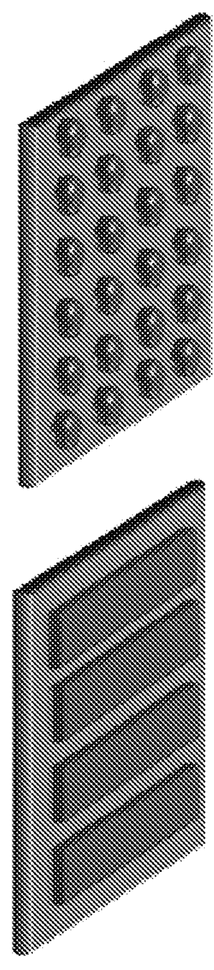
FIG. 6 shows examples configurations of the detectors of the optical processing unit in accordance with an illustrative embodiment.
Figure 6:
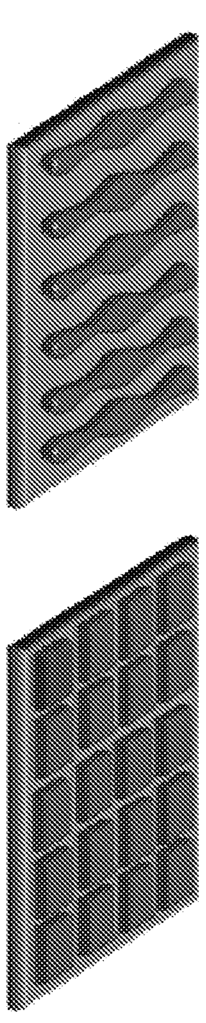

FIG. 6 shows examples configurations of the detectors (e.g., 112) of the optical processing unit (e.g., 118) in accordance with an illustrative embodiment. As shown in FIG. 6, the detection elements (e.g., 110) may be configured in a grid-like array (e.g., square, rectangles, or circular). In some embodiments, the detection elements (e.g., 110) may be configured as an asymmetric pattern.

Figure 7:
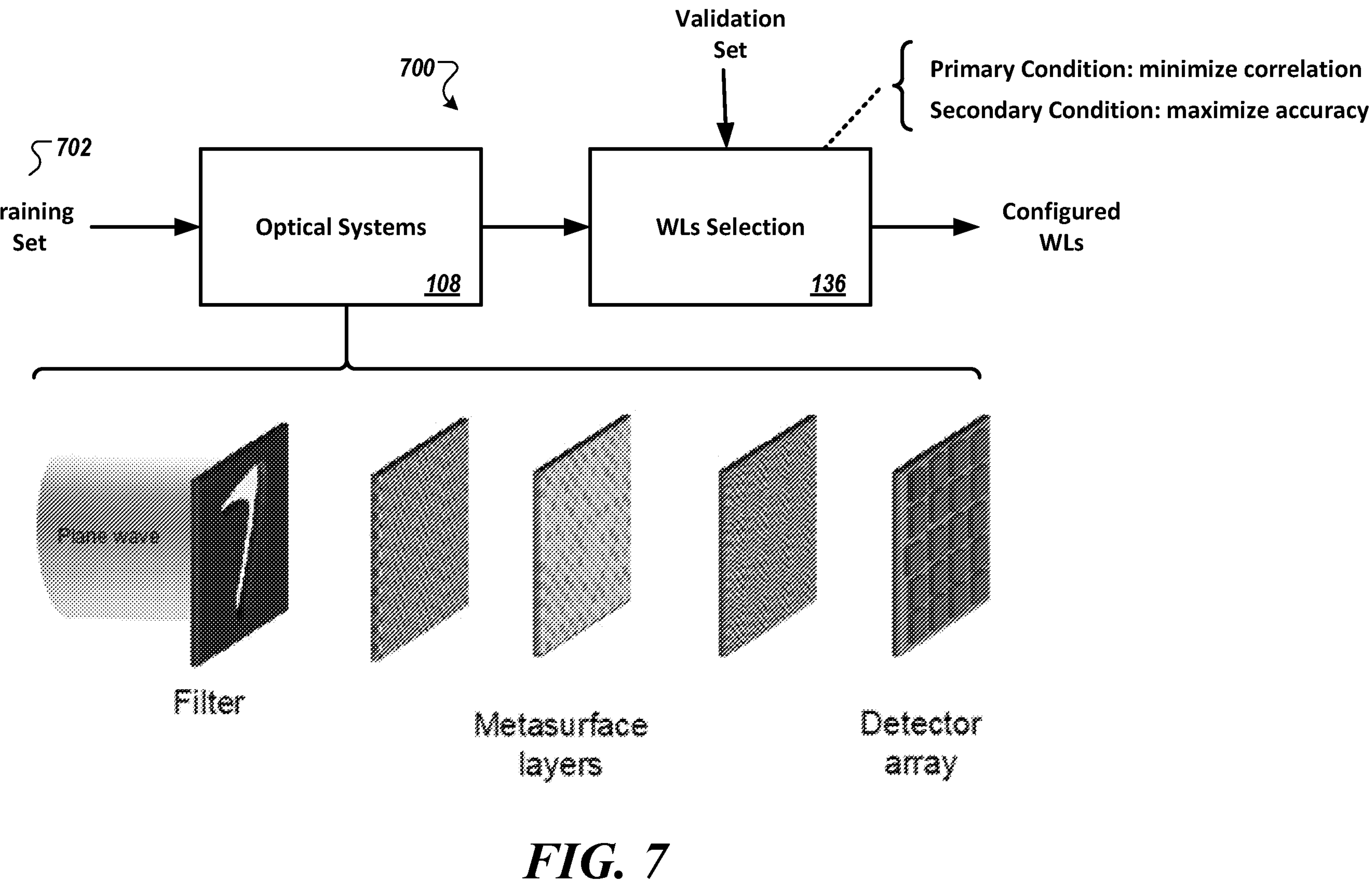
FIG. 7 shows a diagram of an example training operation, e.g., for an optical co-processor system in accordance with an illustrative embodiment.

Weak Learner Configuration. In some embodiments, to configure the weak learner (e.g., 106) for aggregation, a training process is performed. FIG. 7 shows a diagram of an example training operation 700 (e.g., for an optical co-processor system (e.g., 100)) in accordance with an illustrative embodiment. In FIG. 7, the operation 700 includes applying a training data set 702 to the optical processing unit (e.g., 108) and performing a WL selection process (e.g., 136) for a given AI-related tasks or co-processing related tasks (e.g., classification, pattern recognition operation, and clustering). Using the WL selection process, one or more optimization functions are used to minimize correlation of the candidate WLs and/or to maximize accuracy. The training is then cross-validated using a validation data set 704. The resulting WLs selection are stored for a given AI-related tasks or co-processing related tasks.

Co-Processor System with Local-Controller

To improve throughput of the optical co-processing operation, in some embodiments, the optical co-processor unit (e.g., 104) is configured with a local controller.

Figure 1B:
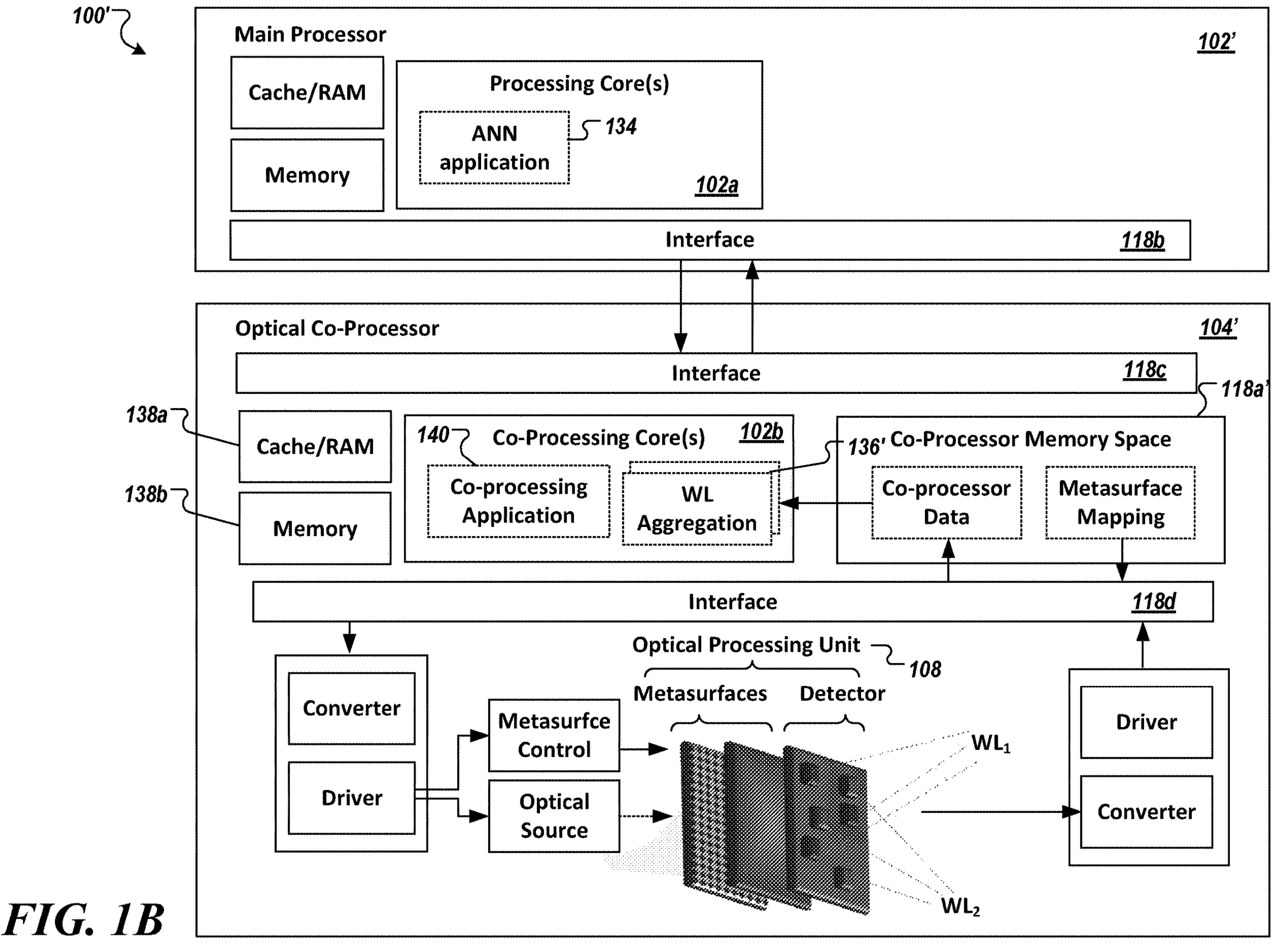
FIG. 1B shows an optical co-processor system in which the optical co-processor unit includes local controller hardware to control the optical processing unit in accordance with another illustrative embodiment.

FIG. 1B shows an optical co-processor system 100 (shown as 100') configured with the main processor unit 102 (shown as 102') and the optical co-processor unit 104 (shown as 104'), e.g., as described in relation to FIG. 1A, in which the optical co-processor unit 104' further includes local controller hardware to control the optical processing unit 108. The local controller hardware may include a co-processing core 102*b*, a co-processor memory 118*a'*, and various internal components 138 (e.g., shown as internal cache or internal RAM 138*a*, clocks 138*b*) to perform a plurality of weak-learner aggregation applications 136 (shown as 136'). The aggregation application 136' may be managed by a co-processing application 140 executing at the local controller. The local controller hardware may include an interface 118*d* that provides the hardware and middleware components to interface with the optical processing unit 108. The local controller hardware may also include an interface 118*c* that provides the hardware and middleware components to interface with the main processor unit 102'. The co-processing application 140 includes instructions for the co-processing core 102*b* to manage multiple co-processing tasks that are invoked by the ANN application 134 executing in the main processor unit 102'.

The main processor unit 102' comprises the one or more processing core(s) 102*a* and executes computer readable instructions for the AI-related application 134 as for example described in relation to FIG. 1A. The main processor unit 102' uses interface **118*b* to interface with the optical co-processor unit 104'**.

Figure 3A:
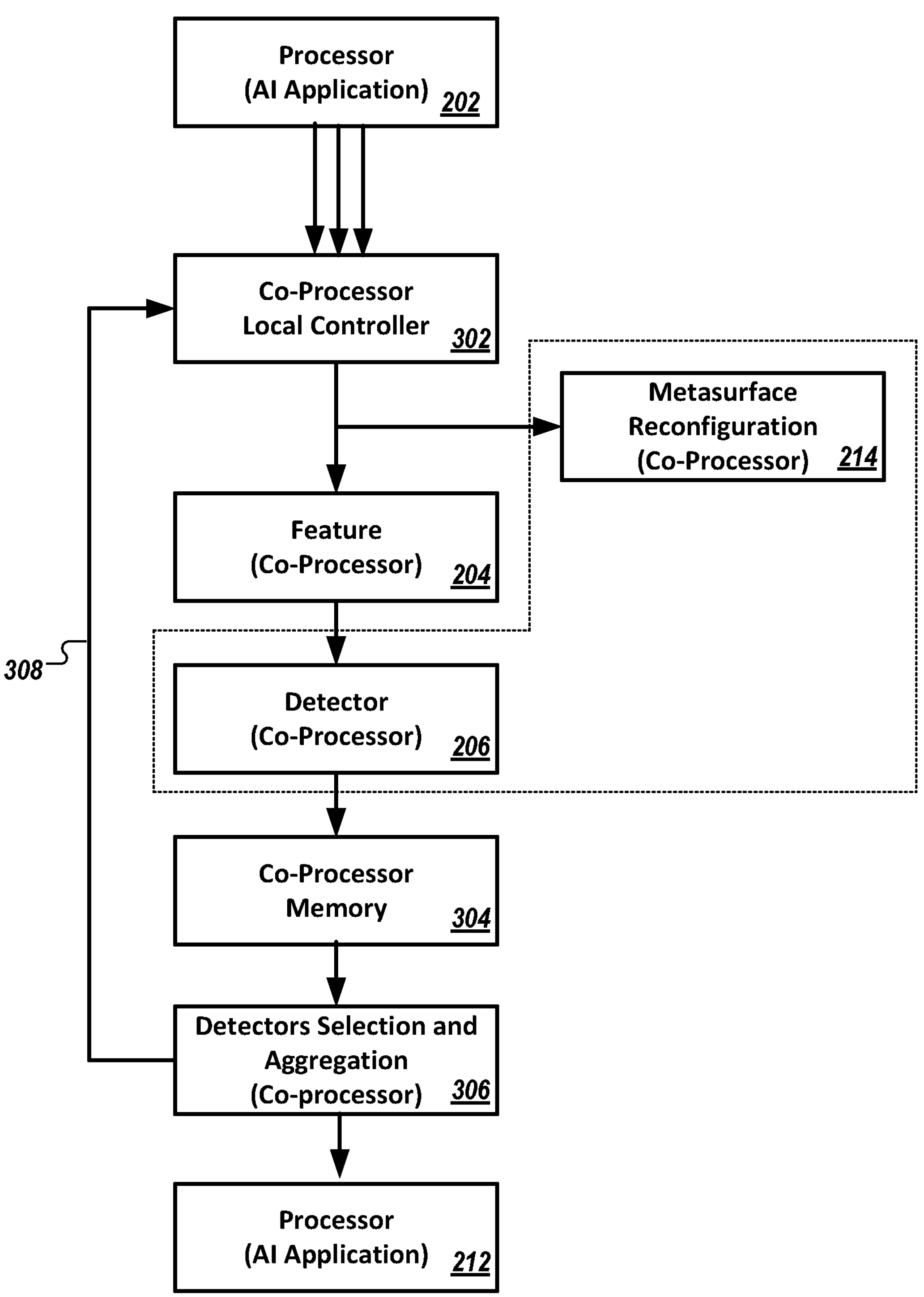
FIG. 3A shows an example operation of the optical co-processor system of FIG. 1B in accordance with an illustrative embodiment.
Figure 3B:
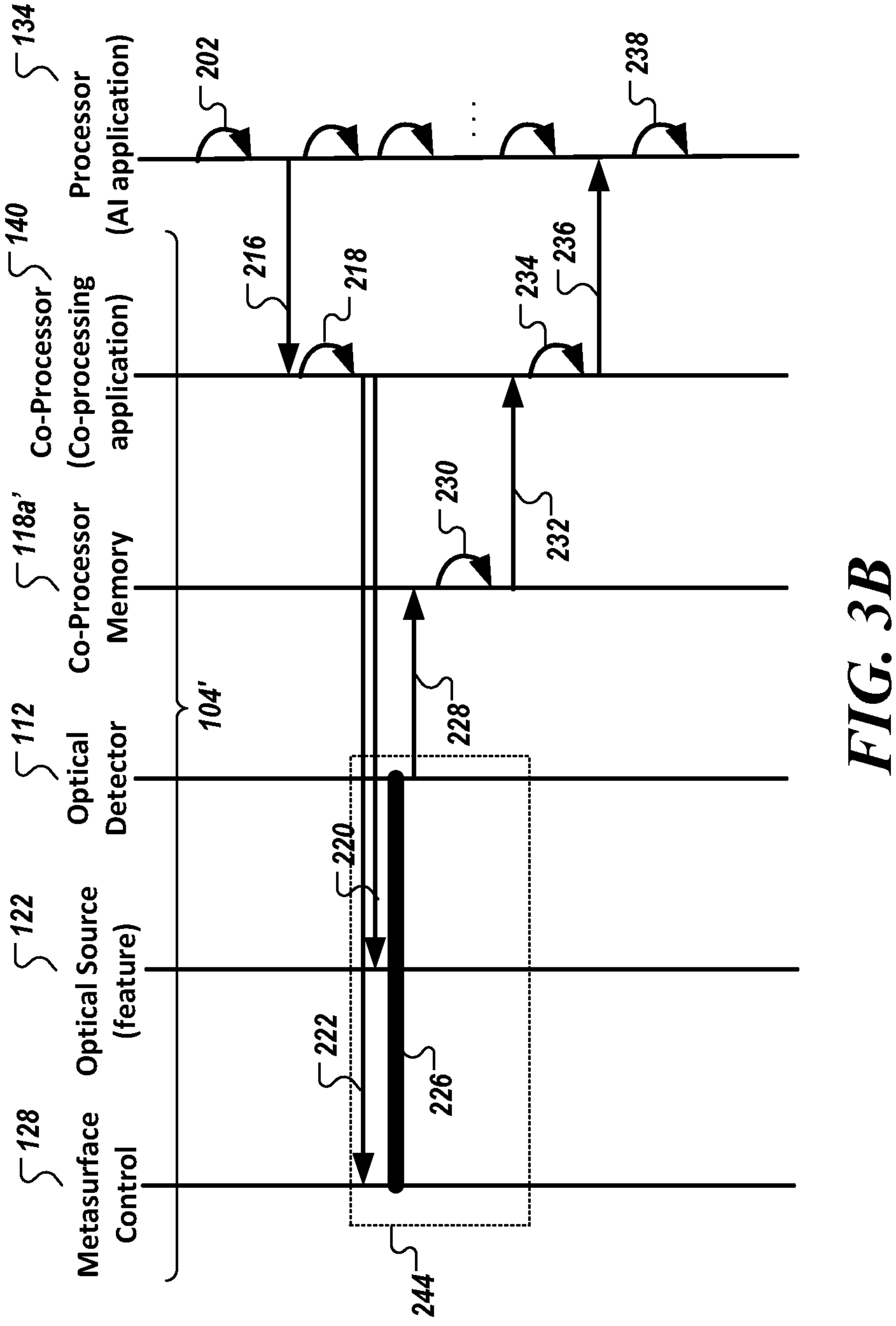
FIG. 3B shows a waterfall diagram illustrating the operation of FIG. 3A in accordance with an illustrative embodiment.

Example Operation. FIG. 3A shows an example operation of the optical co-processor system 100 of FIG. 1B in accordance with an illustrative embodiment. FIG. 3B shows a waterfall diagram illustrating the operation of FIG. 3A in accordance with an illustrative embodiment, which is discussed concurrently with FIG. 3A.

In FIGS. 3A and 3B, the processing unit (e.g., **102*a*) of a main processor unit 102' is executing (202) an ANN application (e.g., 134). The ANN application (e.g., 134) provides (216) one or more optical co-processing task requests to the co-processing application 140 of the local controller. The co-processor operation (140) (e.g., by co-processor local controller 302 of FIG. 3A) processes (218) the ANN command (shown also as 204 in FIG. 3A) and one or more features are sent (220) to the optical co-processor unit (e.g., 104). The co-processor operation (140) also send (222) the metasurface control signals to the metasurface controls 128**.

The optical processing unit (e.g., 108) generates (226) a light beam (or a laser beam) corresponding to the received feature and may modulate (226) the generated optical signal, which is then detected (shown received by detector 206) by the plurality of detection elements 110, as WLs, of the optical processing unit 108. The optical co-processor unit (e.g., 104) then provides (228) the WL outputs to the local controller, which stores (230) the WL outputs in co-processor memory **118*a'***.

The co-processing operation (e.g., 140) executing at the co-processing unit (e.g., **102*b*) (shown by aggregation operation by the co-processor 306 of FIG. 3A) accesses and reads (232) the WL outputs. The processing unit (e.g., 102*b*), e.g., executing the co-processor operation (e.g., 140), then aggregates (234) the read WL outputs. Multiple aggregations may be performed (e.g., shown by iteration loop 308 in FIG. 3A). The co-processing operation (e.g., 140) then provides an output (236) to the ANN application (e.g., 134). Indeed, multiple co-processing operations may be performed under the control of the co-processing operation 140 executing at the local controller, which frees up resource at the main processing unit (e.g., 102'**) to improve throughput of the optical co-processing operation.

It should be appreciated that any of the components or modules referred to with regards to any of the present embodiments discussed herein, may be integrally or separately formed with one another. Further, redundant functions or structures of the components or modules may be implemented. Moreover, the various components may be communicated locally and/or remotely with any user/clinician/patient or machine/system/computer/processor.

Moreover, the various components may be in communication via wireless and/or hardwire or other desirable and available communication means, systems and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

In some embodiments, the exemplary computing platform and associated architecture is used in photonic solutions in computing platforms that enable or facilitate decision-making tasks (e.g., in image processing, pattern recognition, surveillance, medical image analysis).

In some embodiments, the exemplary computing platform and associated architecture provides the ability to form a memory-dependent processor (e.g., LSTM (long-short-term-memory)-based optical network) by adopting the framework to an array of chip-scale optical resonators.

In some embodiments, the exemplary computing platform and associated architecture forms an optical computing paradigm by addressing the complexity of the training process.

It must also be noted that, as used in the specification and the appended claims, the singular forms "a," "an" and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5). Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications and publications as listed below and throughout this document are hereby incorporated by reference in their entirety herein.

REFERENCE LIST

[1] Soljacic, Marin, et al. "Systems and methods for training neural networks." U.S. patent application Ser. No. 15/820,906.

[2] Mower, Jacob C., et al. "Methods, systems, and apparatus for programmable quantum photonic processing." U.S. Pat. No. 9,354,039. 31 May 2016.

[3] Harris, Nicholas Christopher, et al. "Apparatus and methods for optical neural network." U.S. Pat. No. 10,268,232. 23 April 2019.

[4] Englund, Dirk Robert. "Serialized electro-optic neural network using optical weights encoding." U.S. patent application Ser. No. 16/268,578.

[5] Mower, Jacob C., et al. "Programmable photonic processing." U.S. Pat. No. 10,359,272. 23 Jul. 2019.

[6] Ali Adibi, "Ultra-compact Reconfigurable integrated photonic phase shifters," apps.dtic.mil, document no. AFRL-RY-WP-TR-2020-0221, August 2020.

[7] Kiarashinejad, Yashar, Mohammadreza Zandehshahvar, Sajjad Abdollahramezani, Omid Hemmatyar, Reza Pourabolghasem, and Ali Adibi. "Knowledge discovery in nanophotonics using geometric deep learning." Advanced Intelligent Systems 2, no. 2 (2020): 1900132.

[8] Abdollahramezani, Sajjad, Omid Hemmatyar, and Ali Adibi. "Meta-optics for spatial optical analog computing." Nanophotonics 9, no. 13 (2020): 4075-4095.

[9] Kiarashinejad, Yashar, Sajjad Abdollahramezani, Mohammadreza Zandehshahvar, Omid Hemmatyar, and Ali Adibi. "Deep learning reveals underlying physics of light—matter interactions in nanophotonic devices." Advanced Theory and Simulations 2, no. 9 (2019):

[10] Kiarashinejad, Yashar, Sajjad Abdollahramezani, and Ali Adibi. "Deep learning approach based on dimensionality reduction for designing electromagnetic nanostructures." npj Computational Materials 6, no. 1 (2020): 1-12.

[11] Abdollahramezani, Sajjad, Omid Hemmatyar, Mohammad Taghinejad, Hossein Taghinej ad, Yashar Kiarashinejad, Mohammadreza Zandehshahvar, Tianren Fan et al. "Dynamic hybrid metasurfaces." Nano Letters 21, no. 3 (2021): 1238-1245.

What is claimed is:

1. An integrated artificial intelligence (AI) photonic chip comprising a processor; and a photonic co-processor, the photonic co-processor comprising a first interface to the processor and a photonic structure that couples to the first interface and configured with an array of optical perceptrons, wherein the array includes a plurality of optical perceptrons that are each configured as a weak learner having an output that is aggregated with other weak learner outputs of the array to perform an AI-related operation, wherein the aggregated output of the weak learners is reconfigurable and wherein a first weak learner having a first associated accuracy characteristic and a second weak learner having a second associated accuracy characteristic, the aggregated output has a third associated accuracy characteristic higher than the first associated accuracy characteristic and the second associated accuracy characteristic, the photonic structure comprising:

an input structure configured as a waveguide for an electromagnetic (EM) input;

a detection layer comprising an array of detection elements, each detection element of the array of detection elements has a pre-defined spatial region that is configured to generate a respective output for a given optical perceptron; and two or more reconfigurable layers of metasurface structures located between the input structure and the detection layer, including a first metasurface layer and a second metasurface layer, each of the first metasurface layer and the second metasurface layer being re-configurable, via first control signals from the processor to through the first interface to first controllable elements associated with the first metasurface layer and the second metasurface layer to form a first array of aggregated weak learners to vary transmission of the EM input to the detection layer, and via second control signals from the processor to through the first interface to second controllable elements associated with the first metasurface layer and second metasurface layer to form a second array of aggregated weak learners to vary transmission of the EM input to the detection layer.

2. The integrated AI photonic chip of claim 1, wherein the first metasurface layer is configured to modulate, based on the control from the first interface with the processor, at least one of: polarization, frequency, phase, or amplitude of the EM input.

3. The integrated AI photonic chip of claim 1, wherein the first interface comprises:

one or more digital-to-analog (DA) converters; and a set of one or more drivers that is coupled to the first controllable elements of the first metasurface layer.

4. The integrated AI photonic chip of claim 1, wherein the first metasurface layer has a first optical transparent characteristic at a first bias, wherein the first metasurface layer has a second optical transparent characteristic at a second bias, and wherein the first optical transparent characteristic is different from the second optical transparent characteristic to alter a degree of polarization, frequency, phase, or amplitude of the EM input.

5. The integrated AI photonic chip of claim 1, wherein the first interface comprises:

one or more second digital-to-analog (DA) converters; and one or more photoelectric source assemblies coupled to the one or more DA converters, each of the one or more photoelectric sources being configured to generate the EM input.

6. The integrated AI photonic chip of claim 5, wherein the photoelectric source assemblies are coupled to a first end of an optical interconnect, wherein the optical interconnect includes a second end that couples to the input structure.

7. The integrated AI photonic chip of claim 1, wherein the first metasurface layer comprises dielectric or plasmonic inclusions configured to modulate amplitude, phase, polarization, and frequency of the EM input in a subwavelength regime.

8. The integrated AI photonic chip of claim 1, wherein the photonic co-processor further comprises a second interface to the processor, and wherein the second interface comprises:

one or more converters including a first converter that couples to a first detection element of the detection layer.

9. The integrated AI photonic chip of claim 8, wherein the first converter further couples to a second detection element, wherein the output of the first detection element and the second detection element are aggregated to generate a combined output for AI-related operation.

10. The integrated AI photonic chip of claim 1, wherein the AI-related operation includes at least one of: classification, pattern recognition operation, or clustering.

11. The integrated AI photonic chip of claim 3, wherein the first interface comprises:

one or more second digital-to-analog (DA) converters; and a set of second drivers that is coupled to second controllable elements associated with the second metasurface layer.

12. The integrated AI photonic chip of claim 3, wherein the photonic co-processor comprises a second interface to the processor and the photonic structure, wherein the second interface comprises:

one or more second digital-to-analog (DA) converters; and a set of second drivers that is coupled to second controllable elements associated with the second metasurface layer.

13. The integrated AI photonic chip of claim 1, further comprising:

a memory that stored instructions to be executed by the processor, wherein execution of the instructions by the processor, causes the processor to select a weak learner for a given AI operation.

14. The integrated AI photonic chip of claim 1, wherein the photonic co-processor further comprises:

a controller configured by instructions to select a weak learner for a given AI operation.

15. The integrated AI photonic chip of claim 1, wherein the first metasurface layer comprises a reconfigurable hybrid metal-dielectric metasurface structure.

16. The integrated AI photonic chip of claim 15, wherein the reconfigurable hybrid metal-dielectric metasurface structure comprises $Ge_2Sb_2Te_5$.

17. The integrated AI photonic chip of claim 1, wherein the second metasurface comprises a reconfigurable phase-change metasurface structure.

18. The integrated AI photonic chip of claim 17, wherein the reconfigurable phase-change metasurface structure comprises $Ge_2Sb_2Te_5$ (GST) or Ge—Sb—Se—Te (GSST).

19. The integrated AI photonic chip of claim 18, wherein the reconfigurable phase-change metasurface structure is configured to adjust a spectrum of the EM input in at least one of a visible spectrum, a near-IR spectrum, and a mid-IR spectrum.

20. The integrated AI photonic chip of claim 1, further comprising:

a memory that stored second instructions to be executed by the processor, wherein execution of the second instructions by the processor, causes the processor to:

transmit a first configuration signal associated with a first AI operation at a first time period;

transmit a first data signal associated with the first AI operation concurrent in part with the first time period;

transmit a second configuration signal associated with a first second AI operation at a second time period; and transmit a second data signal associated with the second AI operation concurrent in part with the first time period.

* * * * *